United States Patent [19]

Wisor

[11] Patent Number: 5,606,662
[45] Date of Patent: Feb. 25, 1997

[54] AUTO DRAM PARITY ENABLE/DISABLE MECHANISM

[75] Inventor: Michael T. Wisor, Austin, Tex.

[73] Assignee: Advanced Micro Devices, Inc., Sunnyvale, Calif.

[21] Appl. No.: 410,217

[22] Filed: Mar. 24, 1995

[51] Int. Cl.$^6$ .............................. G06F 11/34; G06F 11/10
[52] U.S. Cl. ...................................... 395/185.01; 371/49.2
[58] Field of Search ......................... 371/48, 49.1, 49.2, 371/49.3, 49.4, 50.1, 51.1; 395/185.01, 185.06, 185.07; 364/266.3, 265.3

[56] References Cited

U.S. PATENT DOCUMENTS

| | | | |
|---|---|---|---|
| 5,155,735 | 10/1992 | Nash et al. ............................... | 371/49.1 |
| 5,339,322 | 8/1994 | Rastegar ................................... | 371/51.1 |
| 5,355,377 | 10/1994 | Venkidu et al. ......................... | 371/51.1 |
| 5,392,252 | 2/1995 | Rimpo et al. ........................... | 365/230.02 |

*Primary Examiner*—Robert W. Beausoliel, Jr.
*Assistant Examiner*—Albert Décady
*Attorney, Agent, or Firm*—Conley, Rose & Tayon P.C.; R. Noel Kivlin

[57] ABSTRACT

A memory control unit (MCU) detects whether each bank of a DRAM subsystem will support parity error checking, and based on this determination, selectively disables the system parity error checking for those banks which do not support parity. The MCU automatically enables the system parity error checking for any banks that do support parity error checking. The memory control unit advantageously eliminates the need for the user to know what types of DRAM are in the system or how to configure the system to operate with the current DRAM types. Furthermore, the memory control unit allows for selective generation of parity checking among DRAM banks depending upon which banks support parity. Accordingly, even if one or more DRAM banks do not support parity, the capabilities of those DRAM banks that support parity will not go unused, and the advantages attained by parity error checking will be realized for the DRAM banks that support parity.

16 Claims, 5 Drawing Sheets

AUTO DRAM PARITY ENABLE/DISABLE MECHANISM

BACKGROUND OF THE INVENTION

1. Field of the Invention

This invention relates to memory subsystems and more particularly to the use of parity error checking in computer systems utilizing dynamic memory. The invention also relates to a system for automatically enabling or disabling parity generation depending upon whether a particular memory bank supports parity.

2. Description of the Relevant Art

Many computer systems today allow a user to enable or disable system parity generation via software command based upon the type of dynamic memory (DRAM) installed within the system. A problem is that users can purchase two types of DRAM for their computers: one that supports parity error detection and one that does not. The user must first know whether their DRAM supports parity error checking and, if so, they must also know how to properly configure their system to take advantage of this feature. In addition, all DRAM banks in the system must support parity error checking in order for the system parity error checking to work properly, and thus if one bank cannot support parity, the parity capabilities of the other banks go unused.

Parity is the simplest form of error detection. Parity of a digital byte (for example, of 8 bits) can be either even or odd and is determined by the number of ones the word contains. For each 8-bit byte a ninth bit, or parity bit, is appended to the byte. For odd parity, the parity bit will be set to one if there is an even number of ones in the byte, and the parity bit will be set to zero if there is an odd number of ones in the byte. A parity error is detected upon reading the data byte and verifying the parity of that word. When the data word is read, a new parity bit is generated and compared with the original parity bit. If the two do not match, an error has occurred.

Parity is an error detecting mechanism; it cannot be used to correct an error since it is not known in which bit the error occurred. Therefore, when a parity error occurs there is not much that can be done except to halt the system and/or alert the user. Normally this function is done by asserting the microprocessor's halt, wait, or non-maskable interrupt (NMI). While it may be desirable to automatically reset the system, most systems display a warning and prompt the user to restart the system. The effect of a user disabling parity error checking in a computer system is that the NMI generation function due to a parity error is disabled. Therefore, if an error occurs due to incorrect parity (because the DRAM does not support parity), the system will not generate an NMI and the system will not halt.

As stated previously, to properly configure a computer system, the user must first be aware of whether his or her DRAM supports parity error checking. This is not necessarily a simple task. Component failures, especially memory chips, are common occurrences in today's computer systems. Memory systems consisting of a 4-Mbyte array of 256K DRAM chips can have a mean time between failures of less than 9 months. Both types of DRAM may be used as replacements for the failed chip, which can cause confusion as to the type of DRAM currently found in a machine. Also, when purchasing replacement DRAM chips, the user may be driven by cost concerns and select the cheaper DRAM type which may not support parity error checking. Secondly, a user must know how to enable or disable parity error detection on their computer system. Typically this function can be performed in the setup of the computer system. However, this setup utility is usually only made available to the user upon the user's request. Therefore, if a user has DRAM that supports parity error detection, but the user does not enable this feature in the system, the value of the parity error detection is lost. Lastly, a system will not support parity error checking if the user replaces a memory bank that supported parity with one that does not, thereby rendering the parity checking feature of any other banks useless.

SUMMARY OF THE INVENTION

The problems outlined above are in large part solved by a mechanism and method for automatically enabling or disabling system parity error detection and for selectively generating parity for particular DRAM banks in accordance with the present invention. In one embodiment, a memory control unit (MCU) detects whether each bank of a DRAM subsystem will support parity error checking, and based on this determination, selectively disables the system parity error checking for those banks which do not support parity. The MCU automatically enables the system parity error checking for any banks that do support parity error checking.

The memory control unit advantageously eliminates the need for the user to know what types of DRAM are in the system or how to configure the system to operate with the current DRAM types. Furthermore, the memory control unit allows for selective generation of parity checking among DRAM banks depending upon which banks support parity. Accordingly, even if one or more DRAM banks do not support parity, the capabilities of those DRAM banks that support parity will not go unused, and the advantages attained by parity error checking will be realized for the DRAM banks that support parity.

Broadly speaking, the present invention contemplates a computer system comprising a central processing unit capable of executing a predetermined instruction set, a bus coupled to said central processing unit, and a plurality of memory banks for storing data. The computer system further comprises a memory control unit coupled to said bus and configured to orchestrate a transfer of data between said central processing unit and said plurality of memory banks, wherein said memory control unit includes a selective enable unit for selectively enabling or disabling indication of a parity error for each of said plurality of memory banks.

The present invention finally contemplates a method for automatically enabling or disabling the system NMI generation due to a parity error in a computer system utilizing dynamic memory comprising the steps of (a) resetting the computer system, (b) disabling system NMI generation due to a parity error, and (c) determining if any dynamic memory bank supports parity error checking. The method further comprises the step of enabling system parity based on the determination in step (c) above.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
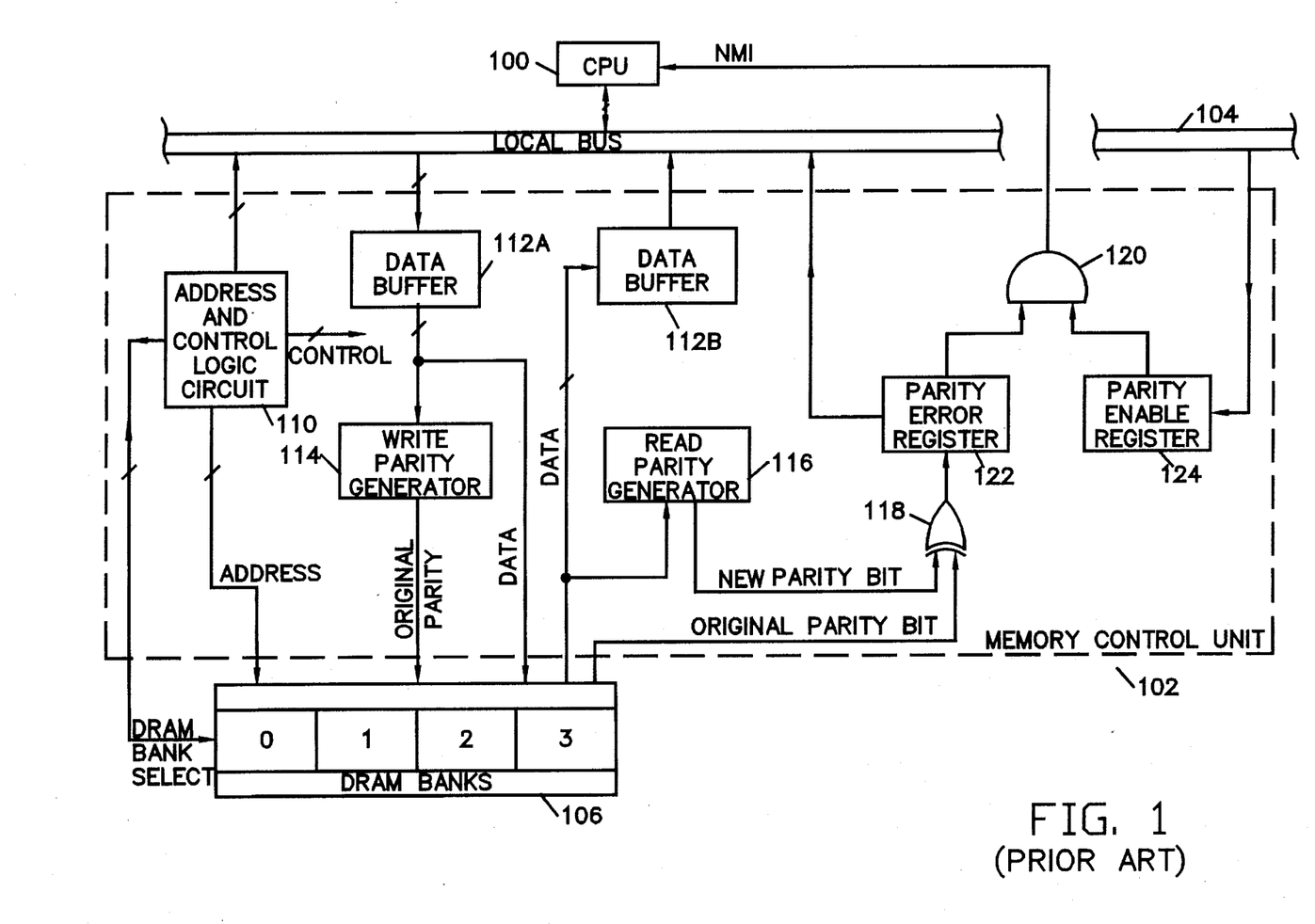
FIG. 1 is a block diagram of a typical computer system implementing parity error detection.

Turning now to FIG. 1, a block diagram of a typical computer system which supports parity error detection is shown. FIG. 1 illustrates a central processing unit (CPU) 100 and a memory control unit (MCU) 102 coupled to a local bus 104. Also shown is a plurality of DRAM banks 106 to the MCU 102.

The memory control unit 102 includes an address and control logic circuit 110, a pair of data buffers 112A and 112B, a write parity generator 114, a read parity generator 116, an exclusive OR gate 118, an AND gate 120, a parity error register 122, and a parity enable register 124. The address and control logic circuit 110 is illustratively shown connected to the local bus 104 and the plurality of DRAM banks 106. The data buffers 112A and 112B are coupled to the local bus 104 and the plurality of DRAM banks 106. The data buffer 112A is also connected to the write parity generator 114, and the data buffer 112B is connected to the read parity generator 116. Exclusive OR gate 118 is shown connected to the plurality of DRAM banks 106 and to the read parity generator 116. AND gate 120 is connected to the CPU 100, the parity error register 122, and the parity enable register 124. The parity error register 122 is finally shown connected to the local bus 104.

During typical operation, the system BIOS is configured to enable or disable the system parity error checking upon reset of the computer system. This is accomplished by either setting or clearing an enable bit associated with the parity enable register 124 via software command. If the system parity error checking is enabled, it is noted that a corresponding input to AND gate 120 is driven high, and thus the assertion of an NMI signal at the output of NAND gate 120 will be dependent upon the state of the other input to AND gate 120, as will be described further below. On the other hand, if the system parity error checking is disabled, the output of AND gate 120 will remain low regardless of the other input to AND gate 120, thus preventing assertion of the NMI signal.

During normal operation when the system error parity checking is enabled, upon a write cycle to one of the DRAM banks 106, the write data is buffered through data buffer 112A of memory control unit 102. The write parity generator 114 generates a parity bit for the corresponding data, and the data along with the parity bit is stored within a selected location of the DRAM banks 106. Subsequently, when the data is read from the DRAM banks 106, the data is passed through data buffer 112B, while the original parity bit is provided to exclusive OR gate 118. In addition, read parity generator 116 generates a new parity bit based on the data read from the DRAM banks. If the new parity bit matches the original parity bit as determined by exclusive OR gate 118, the output of exclusive OR gate 118 will be low, and the parity error register 122 is not set. Accordingly, the NMI signal is not asserted. On the other hand, if the original parity bit does not match the new parity bit, thus indicating that an error has occurred, the parity error register 122 is set in response to the output of exclusive OR gate 118, and the NMI signal is asserted. The invoked NMI service routine may subsequently read the parity error register 122 to determine that a parity error has occurred. A warning may additionally be displayed to prompt the user to restart the computer.

It is noted that for the system of FIG. 1, if any of the DRAM banks 106 do not support parity, the parity enable register must be cleared to effectively disable parity error checking for the entire system. Furthermore, it is noted that the system user must be cognizant of how to reconfigure the system where appropriate if one or more of the DRAM banks are replaced.

Figure 2:
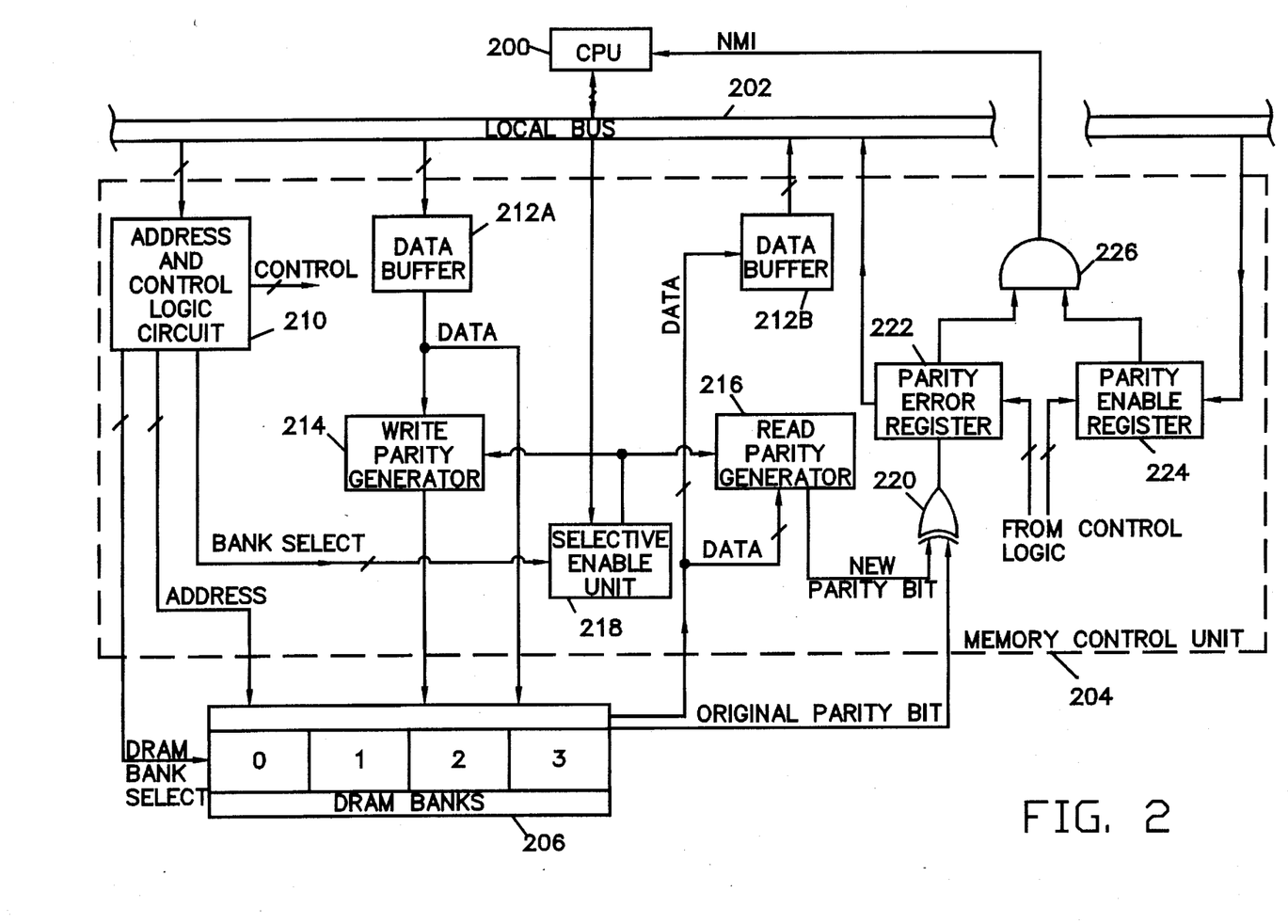
FIG. 2 is a block diagram of a computer system including a memory control unit in accordance with one embodiment.
Figure 3:
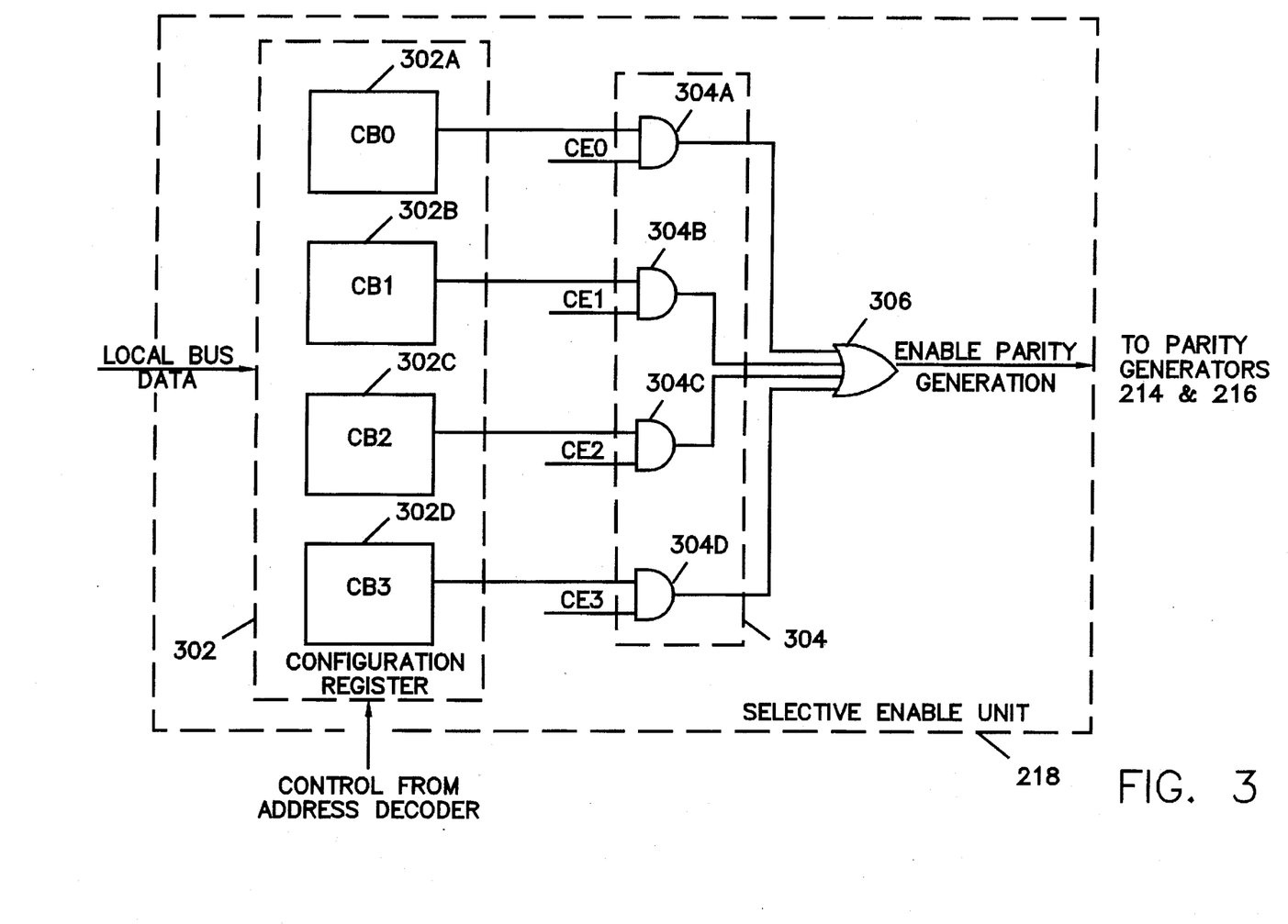
FIG. 3 is a block diagram of a selective enable unit.

A memory control unit in accordance with the present invention will next be described in conjunction with FIGS. 2 and 3. FIG. 2 illustrates a block diagram of a computer system implementing parity error checking with selective enablement of parity checking based on each DRAM bank's ability to support parity. FIG. 3 is a block diagram illustrating an embodiment of a selective enable unit.

The computer system of FIG. 2 includes a microprocessor (CPU) 200 coupled to a memory control unit (MCU) 204 through a local bus 202. Memory control unit 204 is further coupled to a plurality of DRAM banks 206.

Memory control unit 204 includes an address and control logic circuit 210 coupled between local bus 202 and DRAM banks 206, data buffers 212A and 212B, a write parity generator 214, and a read parity generator 216. The memory control unit 204 further includes a selective enable unit 218 coupled to write parity generator 214 and to read parity generator 216. Memory control unit 204 finally includes a NOR gate 220, a parity error register 222, a parity enable register 224, and an AND gate 226.

Write parity generator 114 and read parity generator 116 are devices capable of receiving a data word, or multiple data words, and of generating a parity bit associated with that data word in accordance with a particular parity scheme, i.e. odd or even. This embodiment shows two separate parity generators, one used for data to be written to the plurality of DRAM banks 106, and one used for data read from the plurality of DRAM banks 106. It is understood, however, that a common parity generator could be alternatively employed.

The data buffers 112A and 112B are used to temporarily store data transferred between local bus 202 and DRAM banks 206 to thereby ensure proper timing of read and write cycles. It is noted that buffering of data within MCU 204 may be implemented in a variety of alternative configurations.

Address and control logic circuit 210 is configured to drive appropriate address and bank select signals to the plurality DRAM banks 206. It is noted that address and control logic circuit 210 further controls other well known functions of memory control unit 204, such as timing and other control functions relating to memory data transfers. Specific details regarding such well known operations will not be described herein for simplicity and clarity.

Turning to FIG. 3, an embodiment of selective enable unit 218 is shown. In this embodiment the selective enable unit 218 includes a configuration register 302, a plurality of AND gates 304A–304D, and an OR gate 306. Configuration register 302 is configured to store a plurality of configuration bits 302A–302D.

Configuration register 302 is coupled to receive configuration data from local bus 202. As will be explained in further detail below, the plurality of configuration bits 302A–302D are programmed to selectively enable or disable error parity checking for each respective DRAM bank depending upon the system configuration as determined by the system BIOS. The plurality of configuration bits 302A–302D are connected to the plurality of AND gates 304A–304D and provide input signals thereto. The plurality of AND gates 304A–304D also receive bank select signals CE0–CE3 from the address and control logic circuit 210. The plurality of AND gates 304A–304D connect to the OR gate 306. The OR gate 306 provides a control signal to write parity generator 114 and to read parity generator 116. This control signal either enables or disables the generation of a parity signal by the write parity generator 114 upon a write cycle, and further controls whether a new parity bit is generated by the read parity generator 116 upon a read cycle.

The plurality of configuration bits 302A–302D may be mapped within the configuration space of the computer system, or within any other addressable space of the computer system. It is noted that configuration space is typically used for storing information relating to the current setup of the computer system.

Figure 4:
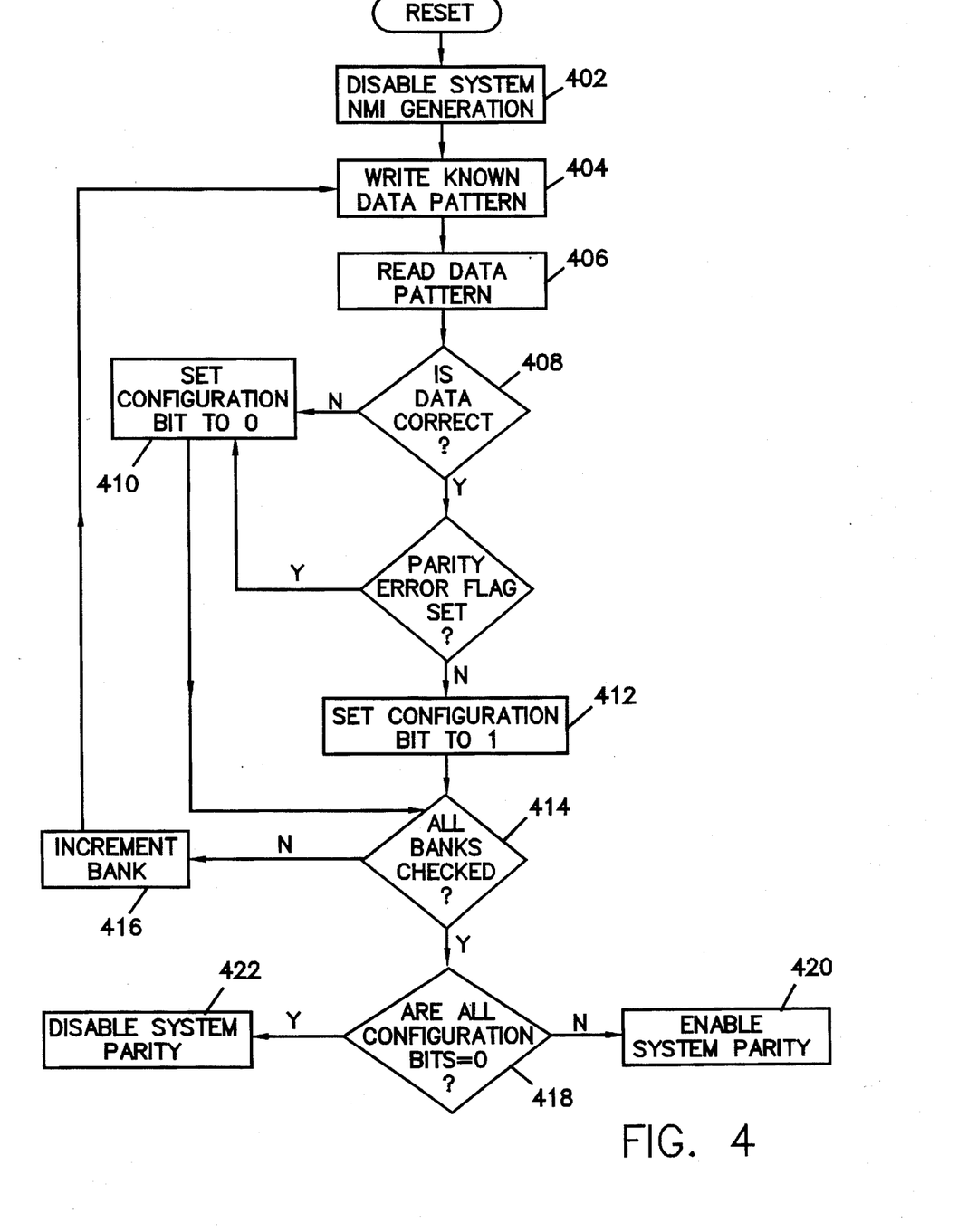
FIG. 4 is a software flow diagram depicting a method of automatically enabling or disabling system parity error checking.

FIG. 4 is a software flow diagram which depicts a method of automatically enabling or disabling system parity error checking within the memory control unit 204 of FIG. 2. The system BIOS is preferably configured to implement the steps as depicted in the software flow diagram of FIG. 4.

Referring to FIGS. 2–4, during initial operation of the computer system following reset, the system BIOS causes the system parity error checking to be disabled by writing a "0" (i.e., clearing) to the parity enable register 224 during step 402. This inhibits the generation of a non-maskable interrupt (NMI) signal. Subsequently, the system BIOS causes the generation of a set of write and read cycles to determine which of the DRAM banks 206 support parity. It is noted that initially each of the configuration bits 302A–302D of configuration register 302 is set high. The system BIOS first causes a write of a known data pattern to DRAM bank 0 (step 404). Since at this point the configuration bit 302A is set, when the address and control logic unit 210 decodes the address, the bank select signal CE0 is driven high, thus causing the output of OR gate 306 to be driven high. This accordingly enables write parity generator 214 to generate a parity bit for the known data pattern. The data along with the parity bit are then stored within DRAM bank 0.

The system BIOS subsequently causes a read of the known data pattern stored in DRAM bank 0. Again, since the configuration bit 302A is set, when the read occurs the read parity generator 216 generates a new parity bit for the known data pattern being read from DRAM bank 206. It is noted that the system is configured such that if the DRAM bank does not support parity, the new parity bit will not be the same as the original parity bit. For example, the system may be configured such that the known data pattern being written into the DRAM bank would result in the generation of a high parity bit. If the DRAM bank does not support parity, this bit would not be stored. Thus, when the data is read from the DRAM bank and the new parity bit is generated from this known data pattern, the new parity bit will be high. The original parity bit from DRAM bank 0, however, would be low since, in effect, no memory location is provided to drive the original parity bit (i.e., the input line to exclusive OR gate 220 which conveys the original parity bit may be passively pulled low with a pull-down resistor). When the original parity bit is different from the new parity bit, the output of the exclusive OR gate 220 will be driven high, thus causing parity register 222 to be set. At this point, however, an NMI is not generated since the system parity is not enabled via parity enable register 224. The system BIOS then reads parity error register 222 to determine whether it had been set by the previous operation (step 408). If the parity error register was set, thus indicating that the DRAM bank 0 does not support parity, the configuration register 302A is cleared by the system BIOS during step 410. On the other hand, if the new parity bit is the same as the original parity bit, thus indicating that the DRAM bank 0 does support parity, the parity error register will not be set. Accordingly, in this situation, configuration register 302A is set (or remains set) during step 412.

Subsequently, a similar write operation using a known data pattern is performed for DRAM bank 1 (i.e., step 414 and 416). The known data pattern stored within DRAM bank 1 is then read, and the read parity generator 216 again generates a new parity bit based on the read data. If the DRAM bank 1 does not support parity, the new parity bit generated by read parity generator 216 will be different from the original parity bit. The system BIOS again reads parity error register 222 to determine whether it was set, and clears the configuration bit 302B if DRAM bank 1 does not support parity. Similar operations are performed for DRAM banks 2 and 3.

Following the above operation and the determination of whether each DRAM bank 0-3 supports parity or not, the parity enable register 224 is set if at least one of the DRAM banks supports parity (steps 418 and 420). Accordingly, during subsequent operations of the computer system (i.e., normal operation), the selective enable unit 218 causes parity to be generated and checked by the memory control unit 204 depending upon those banks which support parity, as reflected by the stored information within configuration register 302. If a particular bank does not support parity, the read parity generator 216 does not generate a new parity bit (i.e., the new parity bit remains low), and thus the output of exclusive OR gate 220 does not cause parity error register 222 to be set for any read operation from the DRAM bank that does not support parity. For any DRAM bank that does support parity, if an error occurs the new parity bit will be different from the original parity bit in accordance with the error checking scheme. Thus, the output of exclusive OR gate 220 will cause parity error register 222 to be set. This responsively causes assertion of the NMI signal. The NMI service routine may subsequently read the parity error register to determine that a parity error has occurred, and may provide a suitable user warning. It is noted that if no DRAM banks support parity, the systems parity checking is disabled by clearing (or keeping cleared) parity enable register 224 during step 422.

It is further noted that the memory control unit 204 may alternatively be configured such that when a read operation from a DRAM bank that does not support parity occurs, the parity error register 222 is prevented from latching and is thus prevented from indicating an error through AND gate 226. Accordingly, the values of the new parity bit and the original parity bit during such cycles are irrelevant, since the output of exclusive OR gate 220 is not latched within parity register 222. It is understood that such control of the parity error register 222 is controlled in accordance with the output of selective enable unit 218 (i.e., the latching of parity error register 222 is made conditional upon the output of selective enable unit 218).

Figure 5:
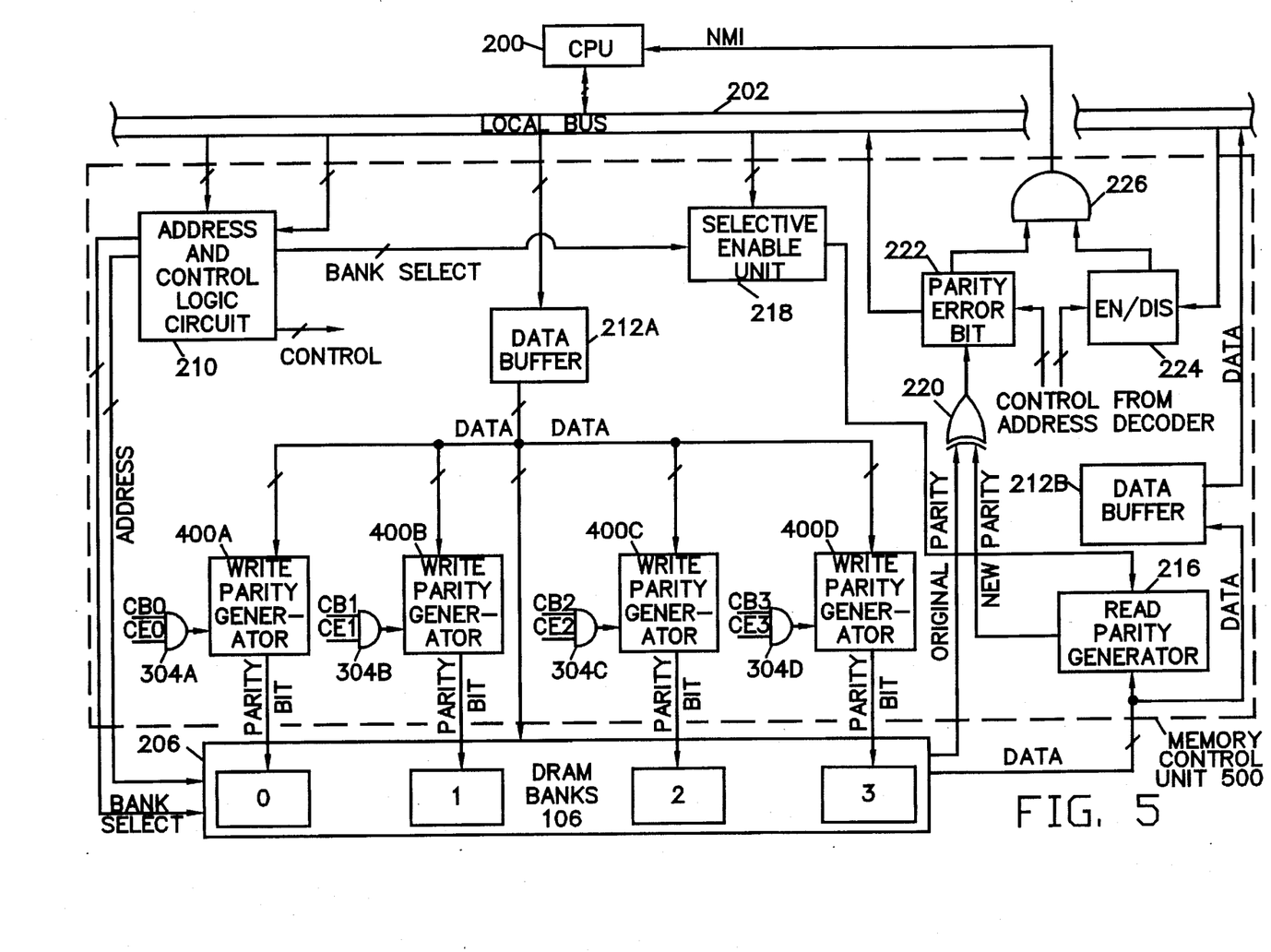
FIG. 5 is a block diagram of another embodiment of a memory control unit in accordance with the present invention.

Referring next to FIG. 5, an alternative embodiment of a memory control unit 500 is shown. Circuit portions that correspond to those of FIG. 2 are numbered identically for simplicity and clarity.

The memory control unit 500 of FIG. 5 is similar to that of FIG. 2 but includes a plurality of separate write parity generators 214A–214D. One write parity generator 214 is provided for each DRAM bank. Each write parity generator 214 is selectively enabled depending upon the stored information within the configuration register 302 of selective enable unit 218. Similar to the embodiment of FIG. 2, during normal operation, an enable bit is generated for data being stored within those DRAM banks that support parity. If a particular bank does not support parity as determined by the system BIOS, the configuration bit 302A–302D associated with that bank will be cleared. Accordingly, a parity bit will not be generated. When a read of the data occurs, the selective enable 218 unit either enables or disables the read parity generator 216. It is noted that the memory control unit 500 is configured such that if parity checking is disabled, the original parity signal will match the new parity signal, and thus the output of exclusive OR gate 220 will be low. Accordingly, the parity error bit is not set.

It is also noted that while the embodiments described above incorporate a single read parity generator 216 which is selectively enabled or disabled depending upon the DRAM bank being accessed, an alternative configuration employs separate read parity generators for each DRAM bank. For such a configuration, the individual read parity generators are selectively enabled or disabled in response to an output from each corresponding configuration bit 302A–302D of configuration register 302.

Furthermore, although the selective enable unit 218 employed within the embodiments described above disables the generation of the parity bit upon writing of data into a DRAM bank that does not support parity, other embodiments are possible wherein the write parity generator continues to generate a parity bit regardless of whether the DRAM bank supports parity. In such an embodiment, the parity bit would not be stored within memory. Subsequently when the data is read from the DRAM bank, the read parity generator again selectively generates the parity bit depending upon whether the DRAM bank supports parity or not. If the DRAM bank does not support parity, the new parity bit is driven identically with the passive state of the "original parity" input line to exclusive OR gate 220. Alternatively, the parity error register 222 is controlled by the control logic such that it will not latch and indicate an error condition.

Numerous variations and modifications will become apparent to those skilled in the art once the above disclosure is fully appreciated. It is intended that the following claims be interpreted to embrace all such variations and modifications.

What is claimed is:

1. A computer system wherein said memory control unit comprising:

a central processing unit capable of executing a predetermined instruction set;

a bus coupled to said central processing unit;

a plurality of memory banks for storing data;

a memory control unit coupled to said bus and configured to orchestrate a transfer of data between said central processing unit and said plurality of memory banks, wherein said memory control unit includes:

an address and control logic circuit connected to said bus and configured to provide a bank select signal indicative of a particular memory bank being accessed;

a parity generator unit connected to said plurality of memory banks and configured to selectively cause an indication of a parity error depending upon said bank select signal; and a selective enable unit for selectively enabling and disabling said indication of a parity error for each of said plurality of memory banks.

2. The computer system as recited in claim 1 wherein said selective enable unit of said memory control unit is coupled to said parity generator unit and configured to selectively enable said parity generator unit depending upon which of said plurality of memory banks support parity error checking.

3. The computer system of claim 2 wherein said selective enable unit comprises:

a plurality of configuration bits coupled to said bus and configured to store data representative of which of said plurality of memory banks support parity error checking;

a plurality of AND gates coupled to said address decoder and to said plurality of configuration bits and configured to receive a control signal and provide a signal indicative of a memory bank that supports parity error checking; and an OR gate coupled to said plurality of AND gates and to the parity generator, and configured to provide a control signal that enables parity generation for a specific memory bank.

4. The computer system of claim 2 wherein said memory control unit further comprises:

a first storage bit coupled to said bus and configured to store a signal representative of a parity error;

a second storage bit coupled to said bus and configured to store a signal that represents the enabling or disabling of system NMI generation due to a parity error;

an AND gate coupled to said first and second storage bits and to said central processing unit, configured to provide a control signal to said central processing unit causing a nonmaskable interrupt; and an exclusive OR gate coupled to said parity generator unit, said plurality of memory banks and to said first storage bit, configured to provide a control signal to said first storage bit.

5. The computer system of claim 4 wherein said parity generator unit comprises:

a first parity generator coupled to said data buffer unit, said selective enable unit and to said plurality of dynamic memory banks, configured to generate parity during a write cycle; and a second parity generator coupled to said selective enable unit and to said plurality of dynamic memory banks, configured to generate parity during a read cycle.

6. The computer system of claim 4 wherein said parity generator unit comprises:

a plurality of parity generators coupled to said data buffer unit, said selective enable unit and to said plurality of dynamic memory banks, configured to generate parity during a write cycle; and a parity generator coupled to said selective enable unit and to said plurality of dynamic memory banks, configured to generate parity during a read cycle.

7. The computer system of claim 5 wherein said plurality of configuration bits are located in the configuration space of said central processing unit's memory.

8. The computer system of claim 1 wherein:

a data pattern and a first parity signal generated by said parity generator unit are written to one of said plurality of memory banks, said data pattern and said first parity signal are read from said one of said plurality of memory banks, a second parity signal is generated by said parity generator unit from said data pattern read from said one of said plurality of memory banks, said first and said second parity signals are compared, wherein the result of said comparison of said first and said second parity signals is indicative of whether said one of said plurality of memory banks supports parity error checking, and said result of said comparison of said first and said second parity signals is coupled to said selective enable unit of said memory control unit.

9. The computer system of claim 8 wherein said result of said comparison enables or disables said indication of parity error for each of said plurality of memory banks.

10. A memory controller configured to enable or disable the system NMI generation due to a parity error in a computer system comprising:

an address latch connected to a bus, configured to receive address signals and of temporarily storing said address signals;

an address decoder coupled to said bus, configured to receive an address signal from a central process unit and of providing a plurality of control signals to a plurality of dynamic memory banks;

a parity generator unit connected to said plurality of dynamic memory banks, configured to generate parity for data that is written to memory and also configured to generate parity for data that is read from memory;

a data buffer unit coupled to said bus, said parity generator and said plurality of dynamic memory banks, configured to temporarily store data and;

a selective enable unit coupled to said address decoder, said bus and said parity generator, configured to selectively enable or disable said parity generator unit for a particular dynamic memory bank.

11. The memory controller of claim 10 wherein:

a known data pattern and a first parity signal generated by said parity generator unit are written to one of said plurality of dynamic memory banks, said data pattern and said first parity signal are read from said one of said plurality of dynamic memory banks, a second parity signal is generated by said parity generator unit from said data pattern read from said one of said plurality of dynamic memory banks, said first and said second parity signals are compared, wherein the result of said comparison of said first and said second parity signals is indicative of whether said one of said plurality of dynamic memory banks supports parity error checking, and said result of said comparison of said first and said second parity signals is written to one of said plurality of configuration bits of said selective enable unit.

12. A memory controller configured to enable or disable the system NMI generation due to a parity error in a computer system comprising:

an address latch connected to a bus, configured to receive address signals and of temporarily storing said address signals;

an address decoder coupled to said bus, configured to receive an address signal from a central process unit and of providing a plurality of control signals to a plurality of dynamic memory banks;

a parity generator unit connected to said plurality of dynamic memory banks, configured to generate parity for data that is written to memory and also configured to generate parity for data that is read from memory;

a data buffer unit coupled to said bus, said parity generator and said plurality of dynamic memory banks, configured to temporarily store data;

a selective enable unit coupled to said address decoder, said bus and said parity generator, configured to selectively enable or disable said parity generator unit for a particular dynamic memory bank;

a plurality of configuration bits coupled to said bus and to said address decoder, configured to store data representative of which dynamic memory banks support parity error checking;

a plurality of AND gates coupled to said address decoder and to said plurality of configuration bits, configured to receive a control signal and of providing a signal indicative of a dynamic memory bank that supports parity error checking; and an OR gate coupled to said plurality of AND gates and to the parity generator, configured to provide a control signal that enables parity generation for a specific dynamic memory bank.

13. The memory controller of claim 12 wherein said memory control unit further comprises:

a first storage bit coupled to said bus and to said address decoder, configured to store a signal representative of a parity error;

a second storage bit coupled to said bus and to said address decoder, configured to store a signal that represents the enabling or disabling of system NMI generation due to a parity error;

an AND gate coupled to said first and second storage bits and to said central processing unit, configured to provide a control signal to said central processing unit causing a nonmaskable interrupt; and an exclusive OR gate coupled to said parity generator unit, said plurality of dynamic memory banks and to said first storage bit, configured to provide a control signal to said first storage bit.

14. The memory controller of claim 12 wherein said parity generator unit comprises:

a first parity generator coupled to said data buffer unit, said selective enable unit and to said plurality of dynamic memory banks, configured to generate parity during a write cycle; and a second parity generator coupled to said selective enable unit and to said plurality of dynamic memory banks, configured to generate parity during a read cycle.

15. The memory controller of claim 14 wherein said parity generator unit comprises:

a plurality of parity generators coupled to said data buffer unit, said selective enable unit and to said plurality of dynamic memory banks, configured to generate parity during a write cycle; and a parity generator coupled to said selective enable unit and to said plurality of dynamic memory banks, configured to generate parity during a read cycle.

16. The computer system of claim 14 wherein said plurality of configuration bits are located in the configuration space of said central processing unit's memory.

* * * * *

UNITED STATES PATENT AND TRADEMARK OFFICE
CERTIFICATE OF CORRECTION

PATENT NO. : 5,606,662
DATED : February 25, 1997
INVENTOR(S) : Michael T. Wisor

It is certified that error appears in the above-indentified patent and that said Letters Patent is hereby corrected as shown below:

Col. 7, claim 1, lines 61 and 62, delete "wherein said memory control unit".

Signed and Sealed this

First Day of July, 1997

Attest:

BRUCE LEHMAN

Attesting Officer

Commissioner of Patents and Trademarks